United States Patent
Ledger et al.

(10) Patent No.: US 11,280,257 B2
(45) Date of Patent: Mar. 22, 2022

(54) KINEMATIC COMPLIANT LINKAGE FOR TURBOCHARGER

(71) Applicant: BorgWarner Inc., Auburn Hills, MI (US)

(72) Inventors: David J. Ledger, Asheville, NC (US); Sean N. Hastings, Arden, NC (US); Thomas C. Harris, Boiling Springs, SC (US); Jonathan R. Williams, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 857 days.

(21) Appl. No.: 16/070,859

(22) PCT Filed: Jan. 19, 2017

(86) PCT No.: PCT/US2017/014017
§ 371 (c)(1),
(2) Date: Jul. 18, 2018

(87) PCT Pub. No.: WO2017/127475
PCT Pub. Date: Jul. 27, 2017

(65) Prior Publication Data
US 2019/0017433 A1 Jan. 17, 2019

Related U.S. Application Data

(60) Provisional application No. 62/281,344, filed on Jan. 21, 2016.

(51) Int. Cl.
*F16C 7/02* (2006.01)
*F16C 7/08* (2006.01)
(Continued)

(52) U.S. Cl.
CPC ............ *F02B 37/186* (2013.01); *F16C 7/02* (2013.01); *F16C 7/08* (2013.01); *F16H 21/44* (2013.01);
(Continued)

(58) Field of Classification Search
CPC .... F16C 7/02; F16C 7/023; F16C 7/08; F16H 21/44; F16K 31/44; F16K 31/5282;
(Continued)

(56) References Cited

U.S. PATENT DOCUMENTS 1,913,513 A 6/1933 Rossman
2,903,909 A * 9/1959 Engel .................... F16C 7/04
74/581

(Continued)

FOREIGN PATENT DOCUMENTS

CN 103237669 A 8/2013
DE 100 55 037 C1 6/2002
(Continued)

*Primary Examiner* — Daniel D Yabut
(74) *Attorney, Agent, or Firm* — Young Basile Hanlon & MacFarlane, P.C.

(57) ABSTRACT

A linkage extends between an actuator and a valve in a turbocharger. The linkage comprises two spaced member bodies having central portions with opposing curved shapes that extend between ends translatable along and rotatable about spaced pivots. Translation of one member toward the other member compresses the central portions, increasing overall stiffness of the linkage, and translation of one member away from the other member creates a gap between the central portions, allowing independent translation of the ends along the spaced pivots to compensate for misalignment between the actuator and the valve caused by heat and vibration. Another linkage extending between an actuator and a valve in a turbocharger includes two planar spaced member bodies extending between ends translatable along (Continued)

and rotatable about spaced pivots. The two member bodies have different thicknesses.

15 Claims, 3 Drawing Sheets

(51) Int. Cl.
*F16H 21/44* (2006.01)
*F16K 31/44* (2006.01)
*F02B 37/18* (2006.01)

(52) U.S. Cl.
CPC .......... *F05D 2220/40* (2013.01); *F16K 31/44* (2013.01); *Y02T 10/12* (2013.01)

(58) Field of Classification Search
CPC .... F16K 31/528; F16K 31/521; F16K 31/563; F02B 37/186; Y10T 74/2146; Y10T 74/2148; Y10T 74/2149; Y10T 74/2144
See application file for complete search history.

(56) References Cited

U.S. PATENT DOCUMENTS

| | | | |
|---|---|---|---|
| 4,894,067 A * | 1/1990 | Bayerstock | F02M 21/0233 48/180.1 |
| 5,797,585 A * | 8/1998 | Auvity | F16K 31/521 251/80 |
| 7,247,004 B2 | 7/2007 | Suganami et al. | |
| 2009/0293654 A1 | 12/2009 | Pintauro | |
| 2012/0097125 A1 | 4/2012 | Doss | |
| 2013/0069335 A1 | 3/2013 | Erdogan | |
| 2014/0169946 A1 * | 6/2014 | Stilgenbauer | F01D 25/18 415/144 |
| 2014/0290240 A1 | 10/2014 | Fauconnier et al. | |
| 2015/0118027 A1 | 4/2015 | Zieboli et al. | |
| 2015/0130159 A1 * | 5/2015 | Nakasato | F16C 7/08 280/124.134 |
| 2016/0258548 A1 * | 9/2016 | Bartolo | F16K 31/521 |

FOREIGN PATENT DOCUMENTS

| | | |
|---|---|---|
| DE | 10 2010 010665 A1 | 9/2011 |
| DE | 102010043147 A1 | 10/2011 |
| DE | 10 2010 040986 A1 | 11/2011 |
| DE | 102010047464 A1 | 4/2012 |
| DE | 102010049466 A1 | 4/2012 |
| DE | 102011007417 A1 | 10/2012 |
| EP | 1349259 A2 | 10/2003 |
| EP | 1741941 A2 | 1/2007 |
| EP | 2336519 B1 | 10/2014 |
| EP | 2821615 A1 | 1/2015 |
| WO | 2005073606 A1 | 8/2005 |
| WO | 2011087939 A2 | 7/2011 |
| WO | 2013022598 A1 | 2/2013 |

* cited by examiner

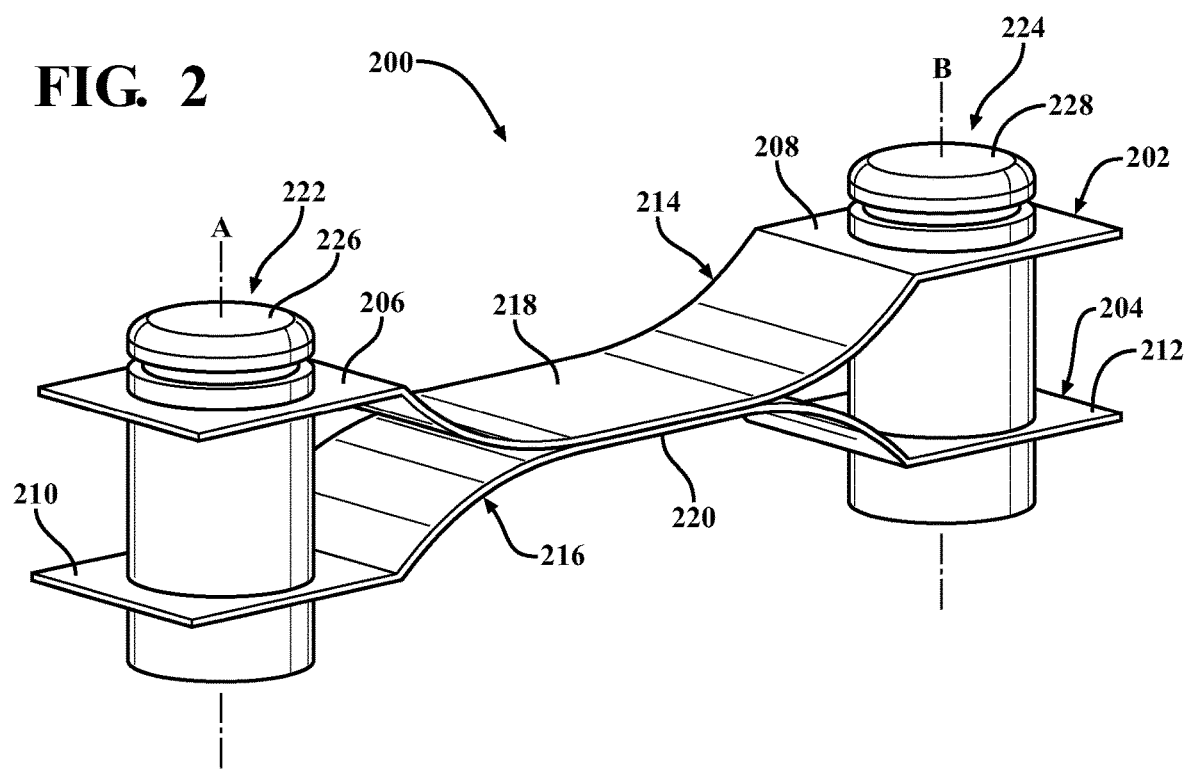
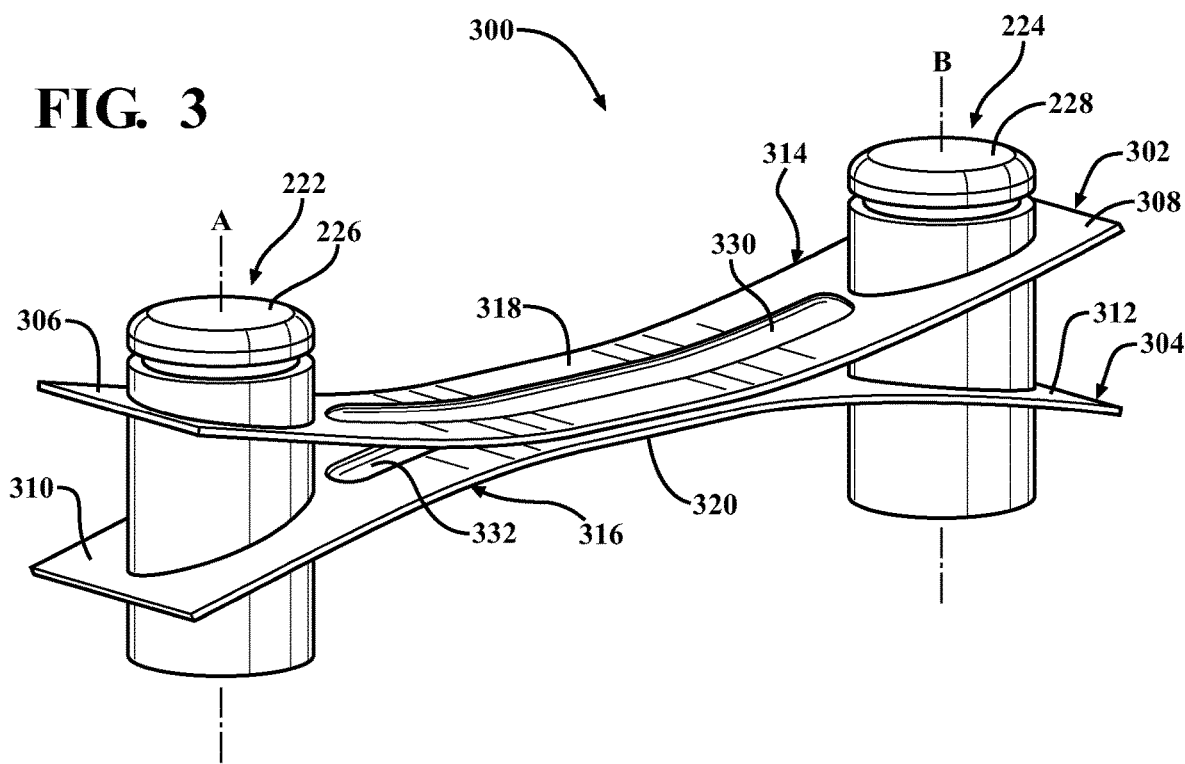

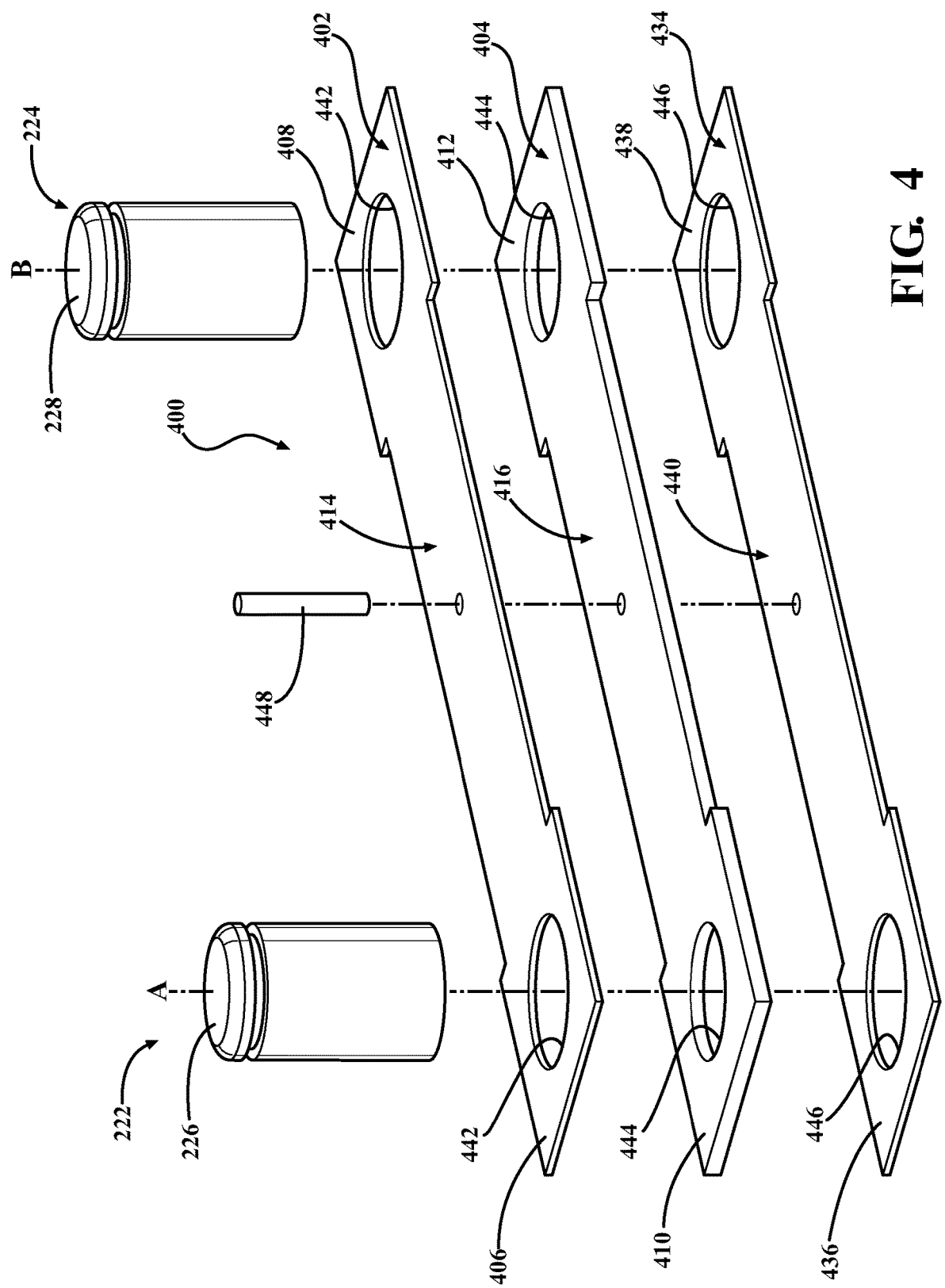

KINEMATIC COMPLIANT LINKAGE FOR TURBOCHARGER

BACKGROUND

In the field of internal combustion engines, turbochargers are forced-induction devices that are used to increase the pressure of the intake air provided to the engine. Increasing the intake air pressure can produce an increased power output relative to a naturally-aspirated engine.

In operation, exhaust gases from the engine are routed to the turbocharger and are used to drive a turbine wheel. The rotational force generated by the turbine wheel is used to drive a compressor wheel, pressurizing ambient intake air and supplying the pressurized intake air to the engine. By pressurizing the intake air, the amount of air and fuel that can be forced into each cylinder during an intake stroke of the engine is increased.

An actuator is used to control the flow of exhaust gases from the engine to the turbocharger through a valve, often called a wastegate. Through use of the actuator, the wastegate moves between an open position and a closed position. Given packaging restraints in the engine compartment, the actuator often requires one or more linkages to drive the wastegate. These linkages can be subject to extreme heat and vibration, thus requiring a robust mechanical design.

SUMMARY

One aspect of the disclosed embodiments is a linkage extending between an actuator and a valve in a turbocharger. The linkage comprises a first member having a first member first end, a first member second end, and a first member body extending between the first member first end and the first member second end. The first member body has a first central portion having a curved shape increasing stiffness of the first member body in compression. The linkage also comprises a second member having a second member first end, a second member second end, and a second member body extending between the second member first end and the second member second end. The second member body has a second central portion having a curved shape increasing stiffness of the second member body in compression. Translation of the first member or the second member toward the other of the first member and the second member compresses the first central portion and the second central portion, increasing stiffness of the linkage.

Another aspect of the disclosed embodiments is a linkage extending between an actuator and a valve in a turbocharger. The linkage comprises a first member having a first member first end pivotably coupled to the actuator by a first pin having a first axis of rotation, a first member second end pivotably coupled to the valve by a second pin having a second axis of rotation, and a first member body planarly extending between the first member first end and the first member second end. The linkage also comprises a second member having a second member first end spaced from the first member first end and pivotably coupled to the actuator by the first pin, a second member second end spaced from the first member second end and pivotably coupled to the valve by the second pin, and a second member body planarly extending between the second member first end and the second member second end. The first member has a first thickness and the second member has a second thickness that differs from the first thickness. Translation of the first member or the second member toward the other of the first member and the second member compresses the first member body and the second member body. Translation of the first member or the second member away from the other of the first member and the second member creates a gap between the first member body and the second member body.

BRIEF DESCRIPTION OF THE DRAWINGS

The description herein makes reference to the accompanying drawings, wherein like referenced numerals refer to like parts throughout several views.

FIG. 2 is a perspective illustration showing an example of a linkage driven to open and close a valve in the turbocharger of FIG. 1.

FIG. 3 is a perspective illustration showing another example of a linkage driven to open and close the valve in the turbocharger of FIG. 1.

FIG. 4 is a perspective illustration showing another example of a linkage driven to open and close the valve in the turbocharger of FIG. 1.

DETAILED DESCRIPTION

Figure 1:
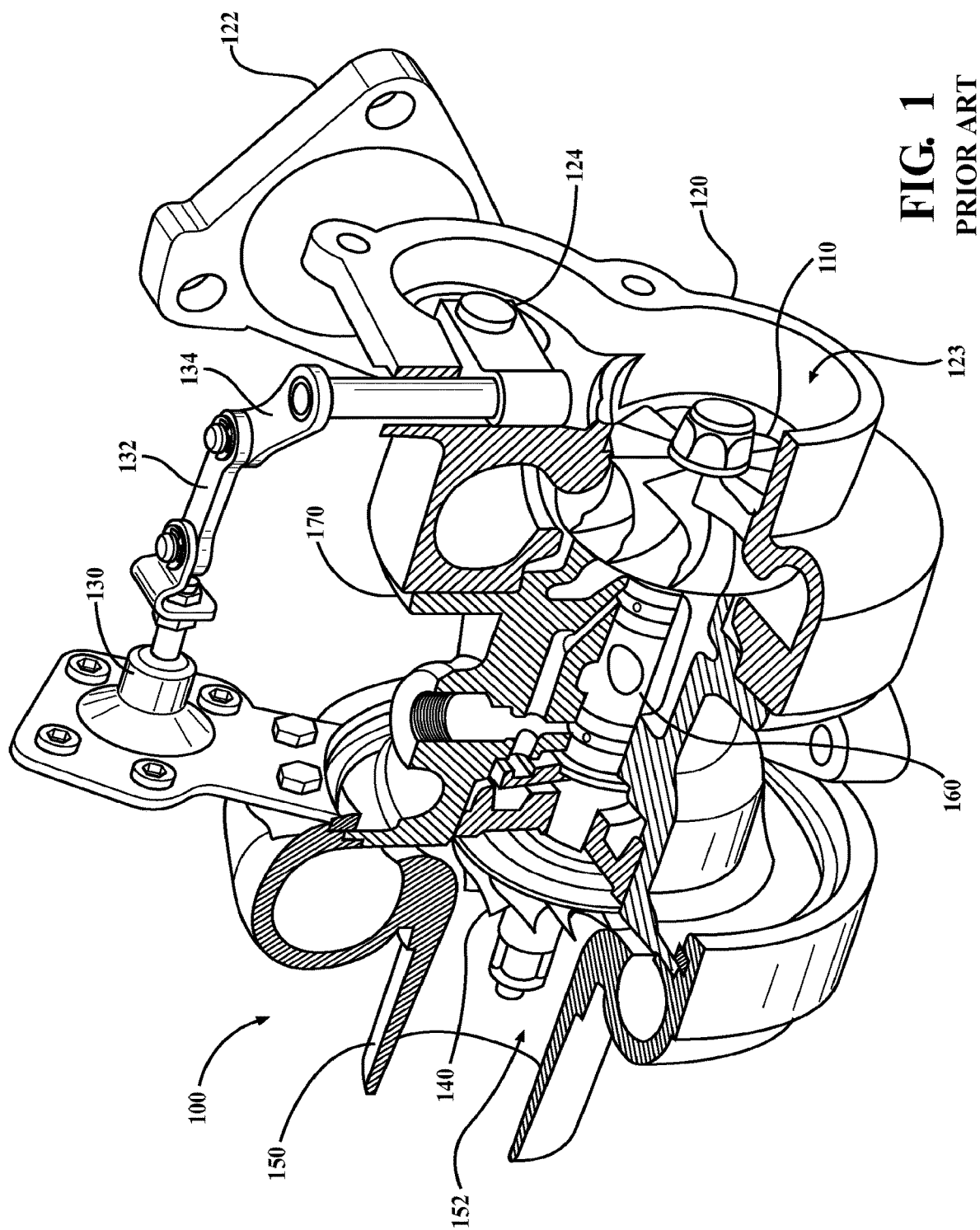
FIG. 1 is a perspective partial cross-section illustration showing a turbocharger.

The disclosure herein is directed to linkages for use in an actuated system. The examples described below show the linkages as located between an actuator and a wastegate in a turbocharger, though the linkages can be used in any actuated system. The linkages include pairs of generally aligned member bodies with curved central portions that extend between opposing ends translatable along and rotatable about spaced pivots. The central portions have opposing curved shapes such that translation of one member body toward the other member body compresses the central portions to increase stiffness and translation of one member body away from the other member body creates a gap between the central portions allowing independent translation of the member bodies to better compensate for misalignment between the actuator and the valve caused by heat and vibration.

FIG. 1 shows a conventional turbocharger 100. The turbocharger 100 is an exhaust-gas-driven, forced-induction device used in conjunction with an internal combustion engine (not shown) to increase power.

The turbocharger 100 includes a turbine wheel 110 located in a turbine housing 120. The turbine housing 120 includes an exhaust gas inlet 122 for receiving exhaust gas from the engine and an exhaust gas outlet 123 for returning exhaust gas to the exhaust circuit (not shown). A wastegate 124 can be mounted within the turbine housing 120 to allow some or all of the exhaust gas to bypass the turbine wheel 110. The wastegate 124 is movable between an open position and a closed position by a control device, such as an actuator 130. Linkages 132, 134 connect the actuator 130 and the wastegate 124 and are conventional dogbone-style linkages. Improved linkages that can replace either one or both of the dogbone-style linkages 132, 134 are described below in reference to FIGS. 2 and 3.

The turbocharger 100 also includes a compressor wheel 140 located in a compressor housing 150. The compressor housing 150 includes an intake air inlet 152 and an intake air outlet (not shown). Intake air is routed from the intake air inlet 152 to the compressor wheel 140, where the intake air is pressurized by rotation of the compressor wheel 140. The intake air then exits the compressor housing 150 at the intake air outlet before being supplied to the engine.

Rotation of the compressor wheel 140 is driven by rotation of the turbine wheel 110. In particular, the turbine wheel 110 and the compressor wheel 140 are connected by a shaft 160. The shaft 160 can be a substantially rigid member, and the turbine wheel 110 and the compressor wheel 140 can be fixedly connected to the shaft 160 in a manner that prevents rotation of the turbine wheel 110 and the compressor wheel 140 with respect to the shaft 160. As a result, the compressor wheel 140 can rotate in unison with the turbine wheel 110 in response to rotation of the turbine wheel 110.

The shaft 160 is supported within a bearing housing 170 such that the shaft 160 freely rotates with respect to the bearing housing 170 at a very high rotational speed. The bearing housing 170, the turbine housing 120, and the compressor housing 150 are all arranged along an axis of rotation of the shaft 160. In this example, the bearing housing 170 is positioned between the turbine housing 120 and the compressor housing 150, with a first end of the bearing housing 170 connected to the turbine housing 120 and a second end of the bearing housing 170 connected to the compressor housing 150. Other types of connections between the turbine wheel 110 and the compressor wheel 140 are also possible.

Given the attachment of the turbocharger 100 to the engine and the exhaust gas circuit, and given the high speed rotation of the shaft 160 and the connected turbine wheel 110 and compressor wheel 140 within the turbocharger 100, the linkages 132, 134 between the actuator 130 and the wastegate 124 are subjected to high levels of heat and vibration. In addition, the actuator 130, the linkages 132, 134, and the wastegate 124 must be designed to properly function for a large number of actuation cycles over the life of the turbocharger 100. In one example, the linkages 132, 134 must be designed to withstand upwards of 40 million actuation cycles.

Improved linkages that better withstand heat, vibration, and large numbers of actuation cycles and that can replace one or both of the conventional dogbone-style linkages 132, 134 used between the actuator 130 and the wastegate 124 are described below. Though the examples described in this application are associated with the wastegate 124 of the turbocharger 100, the improved linkages can alternatively be implemented to increase robustness and/or reduce noise in any form of an actuated system experiencing high-vibration, high-stress, and/or a high number of actuation cycles.

FIG. 2 is a perspective illustration showing an example of a linkage 200 driven to open and close a valve (not shown). The linkage 200 can be used in place of one or both of the linkages 132, 134 of FIG. 1 to open and close the wastegate 124 in the turbocharger 100.

The linkage 200 includes a first member 202 and a second member 204. The first member 202 extends between a first member first end 206 and a first member second end 208. The second member 204 extends between a second member first end 210 and a second member second end 212. The first member 202 includes a first member body 214 that extends between the first member first end 206 and the first member second end 208. The second member 204 includes a second member body 216 that extends between the second member first end 210 and the second member second end 212.

The first member body 214 includes a first central portion 218 that has a curved shape. In the example of FIG. 2, the first central portion 218 has a concave shape when viewed from a side of the linkage 200, though other curved shapes are possible. Including curvature along the first member body 214 can increase the stiffness of the first member body 214 against bending moments caused, for example, by linear translation inputs from the actuator 130. The second member body 216 includes a second central portion 220 that also has a curved shape to increase stiffness against bending moments. In the example of FIG. 2, the second central portion 220 has a convex shape when viewed from a side of the linkage 200, though other curved shapes are possible. The first central portion 218 and the second central portion 220 are shown in a compressed position in FIG. 2.

The first member first end 206 and the second member first end 210 can be coupled, either directly or through the use of another linkage (not shown), to the actuator 130 of FIG. 1 using a first pivot 222. The first member second end 208 and the second member second end 212 can be coupled, again either directly or through use of another linkage (not shown), to the wastegate 124 of FIG. 1 using a second pivot 224. The first pivot 222 can be a first pin 226, and the second pivot 224 can be a second pin 228. The first pin 226 defines a first axis A, and the second pin 228 defines a second axis B. The first member 202 is both translatable along and rotatable about the first axis A of the first pin 226 at the first member first end 206 and translatable along and rotatable about the second axis B of the second pin 228 at the first member second end 208. Similarly, the second member 204 is both translatable along and rotatable about the first axis A of the first pin 226 at the second member first end 210 and translatable along and rotatable about the second axis B of the second pin 228 at the second member second end 212.

The compressed or interference position of the first central portion 218 and the second central portion 220 is achieved when the first member 202 or the second member 204 moves along the first pin 226 and/or the second pin 228 toward the other of the first member 202 and the second member 204. Movements of the members 202, 204 can be caused, for example, by vibration of the engine or by translation/rotation of the actuator 130. When the central portions 218, 220 are compressed, additional non-linear damping of input vibrations and translations is possible, as the stiffness of the linkage 200 is further increased over the stiffness of the members 202, 204 alone. Further, rattling or movement of the first member 202 and/or the second member 204 is greatly reduced, lowering noise and increasing the achievable number of actuation cycles for the linkage 200.

Specifically, the use of compression of the central portions 218, 220 allows the linkage 200 to combat angular bending between the pins 226, 228 and maintain the ability of the ends 206, 208, 210, 212 to both translate along and rotate about the pins 226, 228. Additionally, using opposing members 202, 204 helps avoid the use of more complex spherical bearings, ball joints, etc. (not shown) that would be required for independent rotation about the axes A, B in the case of a single-body-type linkage such as the linkages 132, 134 of FIG. 1.

In the example linkage 200 of FIG. 2, the first member first end 206 and the second member first end 210 both extend substantially parallel to one another and substantially perpendicular to the first axis A, and the first member second end 208 and the second member second end 212 both extend substantially parallel to one another and substantially perpendicular to the second axis B. Further, the first member first end 206 and the second member first end 210 are spaced from each other along the first pin 226, and the first member second end 208 and the second member second end 212 are spaced from each other along the second pin 228. The spacing of the first ends 206, 210, the spacing of the second ends 208, 212, and the curvature of the central portions 218, 220 all factor into the stiffness of the linkage 200 and the amount of translation and compression possible for the linkage 200. By designing the ends 206, 208, 210, 212 to both translate and rotate, the linkage 200 is capable of correcting for any misalignment caused by vibratory inputs to various portions of the actuated system, further increasing the number of actuation cycles that can be achieved using the linkage 200.

FIG. 3 is a perspective illustration showing another example of a linkage 300 driven to open and close a valve (not shown). The linkage 300 can be used in place of one or both of the linkages 132, 134 of FIG. 1 to open and close the wastegate 124 in the turbocharger 100.

The linkage 300 includes a first member 302 and a second member 304. The first member 302 extends between a first member first end 306 and a first member second end 308. The second member 304 extends between a second member first end 310 and a second member second end 312. The first member 302 includes a first member body 314 that extends between the first member first end 306 and the first member second end 308. The second member 304 includes a second member body 316 that extends between the second member first end 310 and the second member second end 312. The first member body 314 includes a first central portion 318 that has a curved shape. In the example of FIG. 3, the first central portion 318 has a concave shape when viewed from a side of the linkage 300, though other curved shapes are possible. The second member body 316 includes a second central portion 320 that also has a curved shape. In the example of FIG. 3, the second central portion 320 has a convex shape when viewed from a side of the linkage 300, though other curved shapes are possible. The first central portion 318 and the second central portion 320 are spaced from each other in FIG. 3. In other words, a gap is present between the first central portion 318 and the second central portion 320.

The first member first end 306 and the second member first end 310 can be coupled, either directly or through the use of another linkage (not shown), to the actuator 130 of FIG. 1 through the first pivot 222 of FIG. 2. The first member second end 308 and the second member second end 312 can be coupled, again either directly or through use of another linkage (not shown), to the wastegate 124 of FIG. 1 using the second pivot 224 of FIG. 2. The first member 302 is both translatable along and rotatable about the first axis A of the first pin 226 at the first member first end 306 and translatable along and rotatable about the second axis B of the second pin 228 at the first member second end 308. Similarly, the second member 304 is both translatable along and rotatable about the first axis A of the first pin 226 at the second member first end 310 and translatable along and rotatable about the second axis B of the second pin 228 at the second member second end 312.

When a gap is present between the first central portion 318 and the second central portion 320, a lesser amount of damping of input vibration occurs, as the stiffness of the linkage 300 is decreased in comparison to the linkage 200 of FIG. 2. Further, the ends 306, 308, 310, 312 of the members 302, 304 can translate and rotate more freely about the pins 226, 228 than is possible during compression of the central portions 318, 320. Having ends 306, 308, 310, 312 that can translate and rotate allows the linkage 300 to compensate for misalignment between the actuator 130 and the wastegate 124 caused by heat and vibration. When input vibrations cause translation in one or more of the ends 306, 308, 310, 312, the central portions 318, 320 of the members 302, 304 will come in contact and compression will occur, much in the manner as described above in reference to the linkage 200 of FIG. 2.

In the example linkage 300 of FIG. 3, the first member first end 306 and the second member first end 310 extend away from each other at an angle to the first axis A. The first member second end 308 and the second member second end 312 also extend away from each other at an angle to the second axis B. The first member body 314 includes a first rib 330 extending between the pins 226, 228, and the second member body 316 includes a second rib 332 extending between the pins 226, 228. The ribs 330, 332 provide additional stiffness to the members 302, 304 against bending moments caused by linear translation inputs from the actuator 130. Though the ribs 330, 332 are shown as located centrally along the member bodies 314, 316, other numbers and configurations of ribs along the member bodies 314, 316 are also possible.

The first member first end 306 and the second member first end 310 are spaced from each other along the first pin 226, and the first member second end 308 and the second member second end 312 are spaced from each other along the second pin 228. The spacing of the first ends 306, 310, the spacing of the second ends 308, 312, the curvature of the central portions 318, 320, and the presence of the ribs 330, 332 all factor into the stiffness of the linkage 300 and the amount of translation and compression possible for the linkage 300. In comparison to the linkage 200 of FIG. 2, the linkage 300 of FIG. 3 can have a greater overall stiffness, both in a state where the gap is present between the central portions 318, 320 as shown and in a state where compression occurs between the central portions 318, 320 (not shown).

FIG. 4 is a perspective illustration showing another example of a linkage 400 driven to open and close a valve (not shown). The linkage 400 can be used in place of one or both of the linkages 132, 134 of FIG. 1 to open and close the wastegate 124 in the turbocharger 100.

The linkage 400 includes a first member 402, a second member 404, and in this example, a third member 434, though any multiple number of members 402, 404, 434 is possible. The first member 402 includes a first member body 414 that planarly extends between a first member first end 406 and a first member second end 408. The first member body 414 has a first thickness. The second member 404 includes a second member body 416 that extends between a second member first end 410 and a second member second end 412. The second member body 416 has a second thickness that is larger than the first thickness. In the example of FIG. 4, the second thickness is approximately two to three times the first thickness, though other thicknesses are possible. The third member 434 includes a third member body 440 that planarly extends between a third member first end 436 and a third member second end 438. The third member body 440 also has the first thickness. The thicknesses chosen for the member bodies 414, 416, 440 are based on the overall stiffness requirements of the linkage 400, that is, the stiffness required to successfully dampen vibrations, reduce rattling, and achieve repeated actuation of the wastegate 124.

The first member first end 406, the second member first end 410, and the third member first end 436 can be coupled, either directly or through the use of another linkage (not shown), to the actuator 130 of FIG. 1 using the first pivot 222 in the form of the first pin 226 of FIGS. 2 and 3. The first member second end 208, the second member second end 212, and the third member second end 438 can be coupled, again either directly or through use of another linkage (not shown), to the wastegate 124 of FIG. 1 using the second pivot 224 in the form of the second pin 228 of FIGS. 2 and 3.

The first member 402 is both translatable along and rotatable about the first axis A of the first pin 226 at the first member first end 406 and translatable along and rotatable about the second axis B of the second pin 228 at the first member second end 408. Translation and rotation of the first member 402 is aided by defining first openings 442 of a first diameter in the first member first and second ends 406, 408. In the example of FIG. 4, the first diameter is larger than the diameter of the pins 226, 228. Collars, for example, in the form of rivets (not shown), can surround the first openings 442 in order to reduce friction at the interface of the first openings 442 and the pins 226, 228.

The second member 404 is also translatable along and rotatable about the first axis A of the first pin 226 at the second member first end 410 and translatable along and rotatable about the second axis B of the second pin 228 at the second member second end 412. The second member first and second ends 410, 412 define second openings 444 having a second diameter smaller than the first diameter. By restricting the diameter of the second openings 444, the second member first and second ends 410, 412 experience a lesser amount of rotation and translation around and along the pins 226, 228 than is experienced by the first member first and second ends 406, 408. This lesser amount of movement better positions the second member 404 for compression by the first member 402 and/or the third member 434 when the linkage 400 is subjected to vibration from the engine or translation/rotation from the actuator 130.

Similarly, the third member 434 is both translatable along and rotatable about the first axis A of the first pin 226 at the third member first end 436 and translatable along and rotatable about the second axis B of the second pin 228 at the third member second end 438. Translation and rotation of the third member 434 is also aided by defining third openings 446 having the first diameter in the third member first and second ends 436, 438. As shown in FIG. 4, the first member 402, the second member 404, and the third member 434 form a stack or sandwich of generally flat plates extending between the pins 226, 228. Each of the members 402, 404, 434 can be formed of a variety of materials, for example, stainless steel, treated steel, nickel, aluminum, Inconel, or composite. The material choice can be made to optimize the overall weight and stiffness of the linkage 400 based on the environment in which the linkage 400 is used. In one example, the first member 402 and the third member 434 can be formed of composite while the second member 404 is formed of treated steel.

Compression or interference between the first member body 414 and the second member body 416, and/or the second member body 416 and the third member body 440 can occur when one of the members 402, 404, 434 moves toward another of the members 402, 404, 434 during vibration, increasing the stiffness of the linkage 400 over the stiffness of any of the members 402, 404, 434 alone and reducing angular bending between the pins 226, 228. The use of stacked or sandwiched members 402, 404, 434 helps avoid the use of spherical bearings, ball joints, etc. (not shown) that are required for independent rotation about the axes A, B in the case of a single-body-type linkage such as the linkages 132, 134 of FIG. 1.

The linkage 400 can also include a pin 448 extending through the first member body 414, the second member body 416, and the third member body 440. In the example of FIG. 4, the pin 448 extends normal to and centrally through the member bodies 414, 416, 440, though other positions for the pin 448 are possible. The member bodies 414, 416, 440 can be translatable along and/or rotatable about the pin 448. The pin 448 can function in conjunction with the pins 226, 228 to help align the member bodies 414, 416, 440 and restrict overall rotation and translation of the members 402, 404, 434 in the linkage 400.

Although the modified linkages 200, 300, 400 described above are described in the context of turbocharger applications, persons of skill in the art will recognize that the modified linkages 200, 300, 400 can be applied in any application in which linkages are used in an actuated system. Further, while the disclosure has been made in connection with certain embodiments, it is to be understood that the disclosure is not to be limited to the disclosed embodiments but, on the contrary, is intended to cover various modifications and equivalent arrangements included within the scope of the appended claims.

What is claimed is:

1. A linkage (200, 300, 400) extending between an actuator (130) and a valve (124) in a turbocharger (100), the linkage (200, 300, 400) comprising:
   a first member (202, 302, 402), comprising:
      a first member first end (206, 306, 406);
      a first member second end (208, 308, 408); and
      a first member body (214, 314, 414) extending between the first member first end (206, 306, 406) and the first member second end (208, 308, 408); and
   a second member (204, 304, 404), comprising:
      a second member first end (210, 310, 410);
      a second member second end (212, 312, 412);
      a second member body (216, 316, 416) extending between the second member first end (210, 310, 410) and the second member second end (212, 312, 412);
      wherein the first member (202, 302, 402) and the second member (204, 304, 404) are translatable along and rotatable about spaced pivots such that the first member (202, 302, 402) and the second member (204, 304, 404) may move toward and away from one another;
      wherein translation of the first member (202, 302, 402) or the second member (204, 304, 404) toward the other of the first member (202, 302, 402) and the second member (204, 304, 404) compresses the first member body (214, 314, 414) and the second member body (216, 316, 416); and
      wherein translation of the first member (202, 302, 402) or the second member (204, 304, 404) away from the other of the first member (202, 302, 402) and the second member (204, 304, 404) creates a gap between the first member body (214, 314, 414) and the second member body (216, 316, 416).

2. The linkage (200, 300) of claim 1, wherein the first member body (214, 314) has a concave shape, and the second member body (216, 316) has a convex shape.

3. The linkage (400) of claim 1, wherein the first member body (414) planarly extends between the first member first end (406) and the first member second end (408), and the second member body (416) planarly extends between the second member first end (410) and the second member second end (412).

4. The linkage (200, 300, 400) of claim 1, wherein the first member first end (206, 306, 406) and the second member first end (210, 310, 410) are coupled to the actuator (130).

5. The linkage (200, 300, 400) of claim 1, wherein the first member second end (208, 308, 408) and the second member second end (212, 312, 412) are coupled to the valve (124).

6. The linkage (200, 300, 400) of claim 1, wherein the first member first end (206, 306, 406) and the second member first end (210, 310, 410) are translatable along and rotatable about a first pivot (222), and the first member second end (208, 308, 408) and the second member second end (212, 312, 412) are translatable along and rotatable about a second pivot (224).

7. The linkage (200, 300, 400) of claim 6, wherein the first member first end (206, 306, 406) and the second member first end (210,310,410) are spaced along the first pivot (222), and the first member second end (208, 308, 408) and the second member second end (212, 312, 412) are spaced along the second pivot (224).

8. The linkage (200, 300, 400) of claim 6, wherein the first pivot (222) is coupled to the actuator (130) and the second pivot (224) is coupled to the valve (124).

9. The linkage (200, 300, 400) of claim 6, wherein the first pivot (222) comprises a first pin (226) having a first axis (A) of rotation, and the second pivot (224) comprises a second pin (228) having a second axis (B) of rotation.

10. The linkage (200, 400) of claim 9, wherein the first member first end (206, 406) and the second member first end (210, 410) extend perpendicular to the first axis (A) of rotation, and the first member second end (208,408) and the second member second end (212, 412) extend perpendicular to the second axis (B) of rotation.

11. The linkage (200, 300) of claim 1, further comprising:
the first member body (214, 314) having a central portion (218, 318) with a curved shape;
the second member body (216, 316) having a central portion (220, 320) with a curved shape; and
wherein translation of the first member body (214, 314) toward the second member body (216, 316) compresses the central portions (218, 220, 318, 320), and translation of the first member body (214, 314) away from the second member body (216, 316) creates a gap between the central portions (218, 220, 318, 320).

12. The linkage (400) of claim 1, further comprising:
the first member (402) having a first thickness, and the second member (404) having a second thickness different from the first thickness;
wherein translation of the first member (402) or the second member (404) toward the other of the first member (402) and the second member (404) compresses the first member body (414) and the second member body (416); and
wherein translation of the first member (402) or the second member (404) away from the other of the first member (402) and the second member (404) creates a gap between the first member body (414) and the second member body (416).

13. The linkage (400) of claim 12, wherein the first member first end (406) and the first member second end (408) define first openings (442) of a first diameter;
wherein the second member first end (410) and the second member second end (412) define second openings (444) of a second diameter; and
wherein the first diameter is larger than the second diameter.

14. A linkage (400) extending between an actuator (130) and a valve (124) in a turbocharger (100), the linkage (200, 300, 400) comprising:
a first member (202, 302, 402), comprising:
a first member first end (206, 306, 406);
a first member second end (208, 308, 408); and
a first member body (214, 314, 414) extending between the first member first end (206, 306, 406) and the first member second end (208, 308, 408); and
a second member (204, 304, 404), comprising:
a second member first end (210,310,410);
a second member second end (212, 312, 412);
a second member body (216, 316, 416) extending between the second member first end (210, 310, 410) and the second member second end (212, 312, 412);
wherein translation of the first member (202, 302, 402) or the second member (204, 304, 404) toward the other of the first member (202, 302, 402) and the second member (204, 304, 404) compresses the first member body (214, 314, 414) and the second member body (216, 316, 416);
wherein translation of the first member (202, 302, 402) or the second member (204, 304, 404) away from the other of the first member (202, 302, 402) and the second member (204, 304, 404) creates a gap between the first member body (214, 314, 414) and the second member body (216, 316, 416);
a third member (434) having the first thickness;
the first member (402) having a first thickness, and the second member (404) having a second thickness different from the first thickness;
wherein translation of the first member (402) or the second member (404) toward the other of the first member (402) and the second member (404) compresses the first member body (414) and the second member body (416);
wherein translation of the first member (402) or the second member (404) away from the other of the first member (402) and the second member (404) creates a gap between the first member body (414) and the second member body (416);
wherein the first member first end (406) and the first member second end (408) define first openings (442) of a first diameter;
wherein the second member first end (410) and the second member second end (412) define second openings (444) of a second diameter;
wherein the first diameter is larger than the second diameter;
a third member first end (436) spaced from the second member first end (410) and pivotably coupled to the actuator (130) by the first pin (226);
a third member second end (438) spaced from the second member second end (412) and pivotably coupled to the valve (124) by the second pin (228); and
a third member body (440) planarly extending between the third member first end (436) and the third member second end (438).

15. The linkage (400) of claim 12, further comprising:
a pin (448) extending through the first member body (414) and the second member body (416), the first member body (414) and the second member body (416) rotatable about and translatable along the pin (448).

* * * * *